April 10, 1928.　　　　　F. N. NUTT　　　　　1,665,320

BUMPER

Filed Oct. 21, 1926

Inventor
Frank N. Nutt

By Blackmore, Spencer & Hrub
Attorneys

Patented Apr. 10, 1928.

1,665,320

UNITED STATES PATENT OFFICE.

FRANK N. NUTT, OF FLINT, MICHIGAN, ASSIGNOR TO A C SPARK PLUG COMPANY, OF FLINT, MICHIGAN, A COMPANY OF MICHIGAN.

BUMPER.

Application filed October 21, 1926. Serial No. 143,190.

My invention relates to an improvement in impact cushioning fenders or bumpers for automobiles.

One of the primary objects of the invention is to provide an economical and simplified construction, capable of withstanding hard usage, and effectively cushioning shocks, and which will be of general application to all makes and types of automobiles, either on the front or rear.

Other objects and advantages will be apparent from the following specification and accompanying drawing, in which Fig. 1 is a top plan view of the bumper forming the present subject matter, attached on the front of an automobile;

Figure 1:
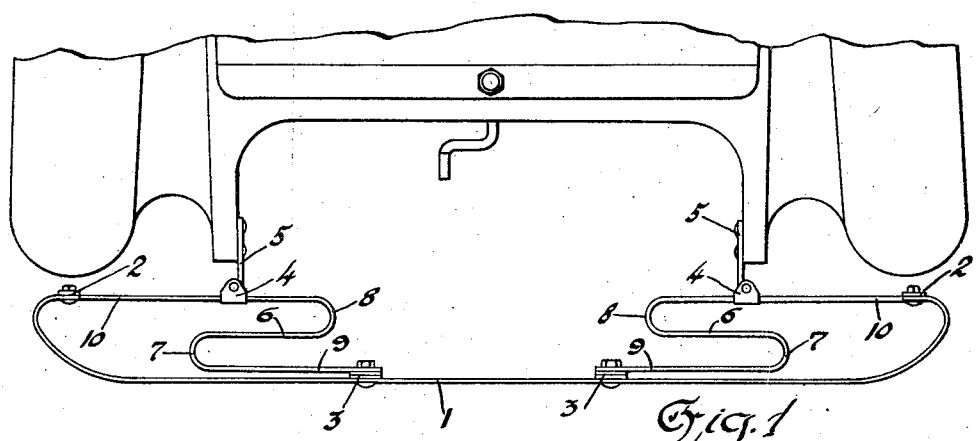

Referring to the drawing, illustrating the preferred embodiment of the invention, the reference character 1 indicates the resilient impact or shock receiving element, which may be a single spring steel bar, but for increased strength, preferably consists of two vertically spaced bars. To maintain such impact bars in proper spaced relation, a connecting member or metal strap 2—2 is provided at each end, and intermediate such ends, toward the center of the bars, are located the straps 3—3. A pair of S-shaped or tortuous brace bars are positioned opposite the space intermediate the pair of impact bars, one at each side, the opposite brace bars being bolted or otherwise attached to the respective straps 2—3. Clips 4 clamp the brace bars to the supporting bracket arms 5 secured to the automobile frame.

Figure 2:
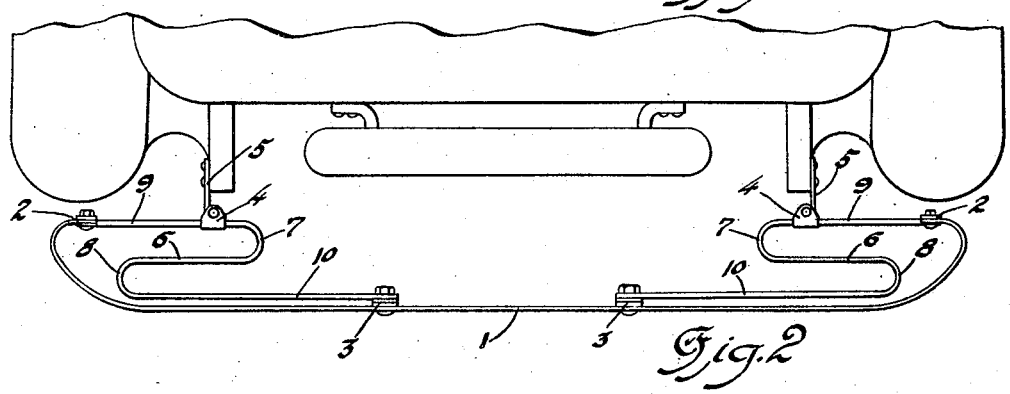
Fig. 2 is a similar top plan view showing the arrangement of the brace bar for attachment to the rear end of an automobile.
Figure 3:
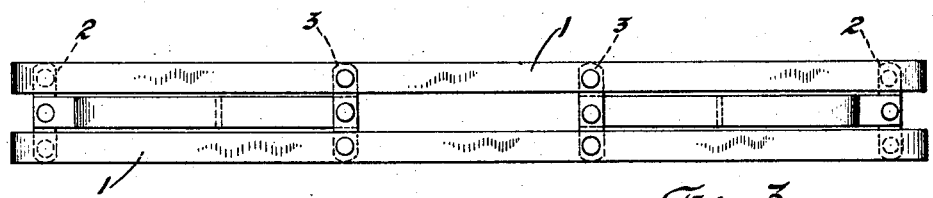
Fig. 3 is a front elevation of the bumper.
Figure 4:
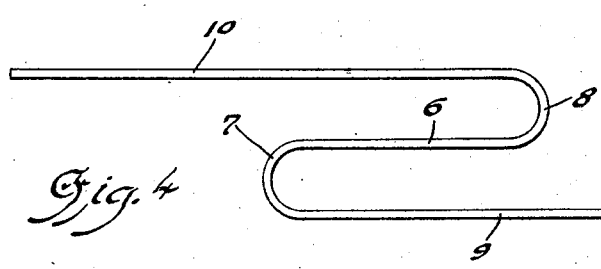
Fig. 4 is an enlarged detail view of the brace bar.

Each tortuous or S-shaped brace bar, preferably consists of a single flat bar of spring steel, bent into its ogee or double reverse curved form, resulting in a straight intermediate portion 6, reversely curved or bent upon itself at 7 and 8 to form the straight end portions or terminal legs 9 and 10, the leg 10 being somewhat longer than the leg 9. Either the end of the long leg 10 or the end of the short leg 9 may be fitted to straps 2 and 3. That is, the attachment relation is reversible end for end. Such alternate arrangement is shown in Figs. 1 and 2, Fig. 1 showing the assembly of the bumper for attachment to the front of an automobile, and Fig. 2 the reverse assembly for the rear. That is, in Fig. 1 the long leg 10 of each brace bar is attached to the spacer strap 2 and the shorter leg 9 to the spacer strap 3, while in Fig. 2 the long leg 10 is fastened to the strap 3 and the short leg 9 to the strap 2.

As a general rule, the longitudinal frame members of an automobile are inclined forwardly toward each other, and the width between the frame members at the front, therefore, is less than at the rear. This variation in frame width is accommodated by the different lengths of brace bar legs 9 and 10, which also affects the spaced relation of the tortuous bodies of the respective brace rods. The space between the curves 8—8 in Fig. 1 is materially less than the space between curves 7—7 in Fig. 2. The smaller space provides ample room at the front of the car for the operation of a hand crank to start the engine, while the reverse arrangement gives the necessary increased space for access to the spare tire usually carried at the rear, while both arrangements permit the mounting of the bumper close to the frame so as not to project unduly beyond the front and rear of the automobile.

From the above description it will be apparent that there is thus provided a bumper of few parts, and which will be standard for all applications, eliminating the necessity for manufacturers and dealers carrying large stocks of various types and special sizes of bumpers.

While the invention has been described more or less specifically, it is to be understood that such modifications may be made as come within the scope of the appended claims.

Having described my invention, I claim:

1. A vehicle bumper including an ogee curved brace bar, one leg of which is longer than the other leg, and an impact bar carried by the brace bar and attached to the respective legs, the relation of the attachments being reversible to accommodate various vehicle frame widths.

2. A vehicle bumper including a pair of S-shaped brace bars, the respective legs of each bar being of different length, and an impact bar having fixed points of attachment for the legs, the attachment of the respective legs being interchangeable to vary the relation of the two brace bars.

3. A vehicle bumper including a resilient impact member and a pair of resilient brace members, each brace member consisting of a tortuous spring having its terminals projecting beyond the tortuous body of the spring to different lengths, each terminal being adapted for connection with either an end or an intermediate portion of the impact member, such alternate connection permitting variation in the space between the tortuous bodies of the respective brace members.

4. A vehicle bumper including a pair of S-shaped brace bars to be carried one on each side of the vehicle frame, each consisting of a single strip of spring metal having an intermediate straight portion connected by reverse curves to two straight end portions, one of which is longer than the other, and an impact element, the ends of which are respectively attachable to either end portion of one of said brace bars, the other end portion of such brace bar being attachable to an intermediate portion of the impact element, whereby an unobstructed space is left between the respective brace bars, the size of such space being dependent upon whether the long or short end portions of the brace bars are attached to the ends of the impact element.

5. A vehicle bumper including a resilient impact member and a pair of resilient brace members, each brace member consisting of an intermediate spring portion with end portions extending therebeyond to different lengths, each end portion being adapted for connection with definite points of attachment on the impact member, the variation in length of the end portions permitting variation in the spaced relation of the brace members by reverse attachment of the end portions.

6. A vehicle bumper including a resilient impact member and a pair of resilient brace members, each brace member consisting of an intermediate spring portion with end portions extending therebeyond to different lengths, either of said end portions being attachable to a fixed point of connection on the impact member, whereby the attachment of one end portion provides an intervening space between the spring portions of the two brace members, that differs from that provided by the attachment of the other end portion.

In testimony whereof I affix my signature.

FRANK N. NUTT.